(12) United States Patent
Liu et al.

(10) Patent No.: US 8,229,298 B2
(45) Date of Patent: *Jul. 24, 2012

(54) METHOD AND DEVICE FOR DETECTING DISPERSION, OPTICAL SIGNAL TRANSMISSION SYSTEM

(75) Inventors: Yue Liu, Shenzhen (CN); Lijun Li, Shenzhen (CN); Zhihui Tao, Shenzhen (CN); Wei Fu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 886 days.

This patent is subject to a terminal disclaimer.

(21) Appl. No.: 12/269,502

(22) Filed: Nov. 12, 2008

(65) Prior Publication Data

US 2009/0127443 A1    May 21, 2009

Related U.S. Application Data

(63) Continuation of application No. PCT/CN2007/000257, filed on Jan. 24, 2007.

(30) Foreign Application Priority Data

May 13, 2006   (CN) .......................... 2006 1 0080030

(51) Int. Cl.
    *H04B 10/08*    (2006.01)
(52) U.S. Cl. ............... 398/29; 398/25; 398/28; 398/147
(58) Field of Classification Search ............ 398/25, 398/28, 30, 32, 33, 81, 147–150, 158, 208, 398/209, 212–214; 356/73, 73.1; 250/227, 250/227.18

See application file for complete search history.

(56) References Cited

U.S. PATENT DOCUMENTS 5,999,289 A * 12/1999 Ihara et al. .................... 398/147
6,363,187 B1   3/2002 Fells et al.
6,487,352 B1  11/2002 Sobiski et al.
(Continued)

FOREIGN PATENT DOCUMENTS

CN          1215265 A      4/1999
(Continued)

OTHER PUBLICATIONS

First Office Action in Chinese Application No. 200610080030.3, mailed Feb. 15, 2008.

(Continued)

*Primary Examiner* — Li Liu
(74) *Attorney, Agent, or Firm* — Leydig, Voit & Mayer, Ltd.

(57) ABSTRACT

The present invention discloses a method for detecting dispersion, overcoming disadvantages of complex configuration and insensitivity to a tiny dispersion of the method and device for detecting dispersion in the prior art. The inventive method includes: obtaining a signal within a predetermined bandwidth range from an optical signal received; obtaining an operated value of power via an operation on the signal within the predetermined bandwidth range; and obtaining amount of system dispersion according to a corresponding relation between the operated value of power and the amount of system dispersion. A device for detecting dispersion is disclosed, including a photoelectric filter operational unit and a processing unit, where an output of the photoelectric filter operational unit is connected to an input of the processing unit. The device for detecting dispersion of the present invention is applicable to an adaptive dispersion compensation system. An optical signal transmission system is further disclosed.

14 Claims, 6 Drawing Sheets

U.S. PATENT DOCUMENTS

2002/0159672 A1* 10/2002 Fells et al. .................. 385/13
2004/0156038 A1* 8/2004 Cao .......................... 356/73.1

FOREIGN PATENT DOCUMENTS

| CN | 100461653 C | 2/2009 |
|---|---|---|
| EP | 1 081 881 A2 | 3/2001 |
| EP | 1 251 647 A1 | 3/2002 |
| JP | 11122173 A | 4/1999 |
| WO | WO 2007/131401 A | 11/2001 |

OTHER PUBLICATIONS

Second Office Action in Chinese Application No. 200610080030.3, mailed Aug. 1, 2008.

Written Opinion in PCT Application No. PCT/CN2007/000257, mailed May 24, 2007.

Office Action in Japanese Application No. 2009-510259, mailed Jun. 1, 2010.

Yu, Qian, et al., "Chromatic Dispersion Monitoring Technique Using Sideband Optical Filtering and Clock Phase-Shift Detection," *Journal of Lightwave Technology*, vol. 20, No. 12, Dec. 2002, pp. 2267-2271.

Luo, T., et al., "All-Optical Chromatic Dispersion Monitoring of a 40-Gb/x RZ Signal by Measuring the XPM-Generated Optical Tone Power in a Highly Nonlinear Fiber," *IEEE Photonics Technology Letters*, vol. 18, No. 2, Jan. 15, 2006, pp. 430-432.

Peterson, M.N., et al., "Dispersion monitoring and compensation using a single in-band subcarrier tone," *Optical Society of America*, Document No. WH4-1, 2000.

Information Disclosure Statement in U.S. Appl. No. 12/772,190, filed Jun. 115, 2010.

U.S. Appl. No. 13/253,744, filed Oct. 5, 2011.

International Search Report in corresponding PCT Application No. PCT/CN2007/000257 (May 24, 2007).

Extended European Search Report in corresponding European Application No. 07702186.3 (Aug. 25, 2009).

Rejection Decision in corresponding Japanese Application No. 2009-510259 (May 28, 2010).

* cited by examiner

METHOD AND DEVICE FOR DETECTING DISPERSION, OPTICAL SIGNAL TRANSMISSION SYSTEM

CROSS-REFERENCE TO RELATED APPLICATIONS

This application is a continuation of International Patent Application No. PCT/CN2007/000257, filed Jan. 24, 2007, which claims priority to Chinese Patent Application No. 200610080030.3, filed May 13, 2006, both of which are hereby incorporated by reference in their entirety.

FIELD OF THE INVENTION

The present invention relates to the field of optical transmission, and in particular to a method and a device for detecting dispersion in an adaptive dispersion compensation system.

BACKGROUND OF THE INVENTION

Various frequency components or various mode components of a signal transmitted in an optical fiber have different transmission speeds, which results in waveform distortion of the signal, and such phenomena are referred to as dispersion. The impact of the dispersion on the optical transmission causes intersymbol interference between data pulses. Therefore, dispersion compensation is necessary for ensuring transmission performance of a system. For a high speed optical transmission system in a speed of above 40 Gb/s or an optical transmission network desired to be dynamically configured, a solution of adaptively adjustable dispersion compensation is necessary. To implement the adaptive dispersion compensation system, a mechanism of dispersion detection and feedback control is necessary.

At present, there are primarily three solutions of adjustable dispersion compensation, i.e. dispersion compensation based on adjustable chirped optical fiber Bragg grating, pre-distortion at the transmission side, and equilibrium at the reception side.

Three solutions of dispersion detection in the above dispersion compensation systems are primarily described as follows.

In solution 1, the amount of dispersion is determined through comparison of phase difference between clock signals.

Figure 1:
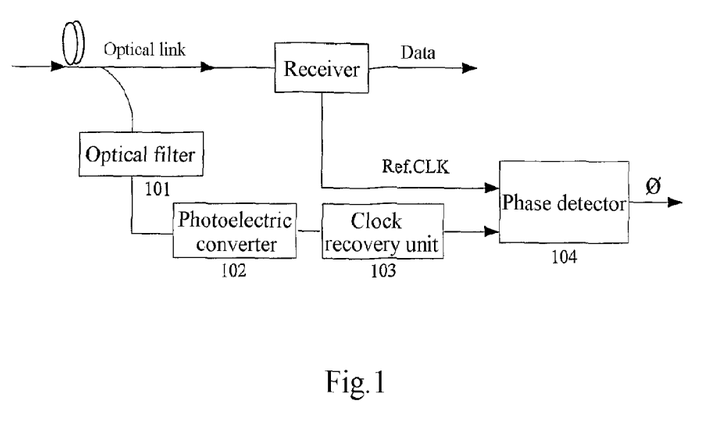
FIG. 1 is a schematic structural diagram of a device for detecting dispersion through comparison of phase difference between clock signals.

Referring to FIG. 1, a method for detecting dispersion disclosed in a paper entitled "Chromatic Dispersion Monitoring Technique Using Sideband Optical Filtering and Clock Phase-shift Detection", Journal of Lightwave Technology (JTL), Vol. 20, No. 12, is shown. In this method, a Vestigial side band-Upper (VSB-U) signal or a Vestigial side band-Low (VSB-L) signal on the signal spectrum is filtered out via an optical filter 101 before the photoelectric conversion at the reception side, then the photoelectric conversion is performed on the VSB-U signal or VSB-L signal through a photoelectric converter 102. A clock signal is extracted by a clock recovery unit 103, and the phase information of the sideband signal is clarified. Subsequently, the amount of dispersion is determined through the comparison of phase difference between two clock signals corresponding to the sideband signal and a baseband signal respectively.

This solution requires two sets of high speed photoelectric conversion and processing configuration, and is complicated in the configuration. In addition, periodical repetition may occur to the clock phase difference, therefore, only the amount of dispersion corresponding to up to the range of one clock cycle may be measured, and the range of the amount of measurable dispersion is limited.

In solution 2, a transmission signal is added with a harmonics detection signal which is extracted after the photoelectric conversion at the reception side, and the amount of system dispersion is determined via the intensity of the harmonics detection signal at the reception side.

Figure 2:
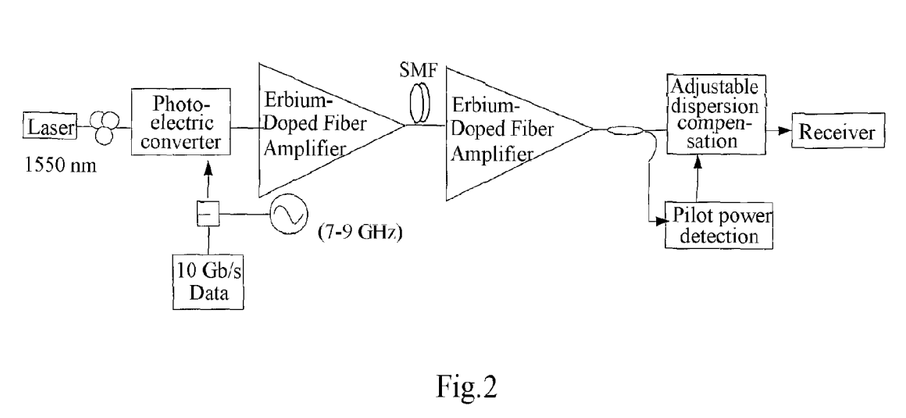
FIG. 2 is a schematic structural diagram of a device for detecting dispersion through a harmonic detection signal.

Referring to FIG. 2, a solution of dispersion monitoring and compensation using a single in-band sub-carrier tone, disclosed in WH4, OFC2001, is shown. In this solution, a harmonics detection signal is added, via a modulator, to a signal transmitted into a transmission line, spectrum power of the harmonics detection signal is separated by an electric filter after the photoelectric conversion of the optical signal at the reception side, and the amount of system dispersion is determined according to the decrease in the amount of power.

In this method, an additional tune device needs to be added at the transmission side, which increases the complexity of system.

In solution 3, an optical signal is converted to an electric signal, and the amount of system dispersion is determined by detecting a change of a first minimum point of dispersion in power spectrum.

Figure 3:
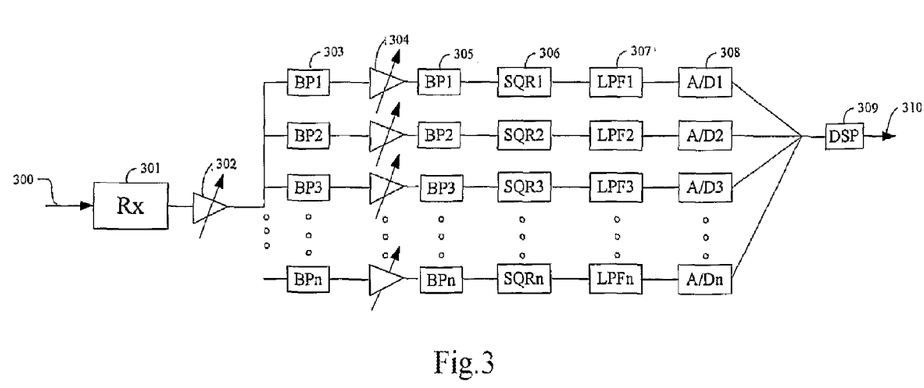
FIG. 3 is a schematic structural diagram of a device for detecting dispersion through detecting a change of the first minimum point of dispersion in power spectrum.

A dispersion detection solution is disclosed in U.S. Pat. No. 6,487,352. As shown in FIG. 3, the implementation of this detection solution is as follows: After the photoelectric conversion of an optical signal, the signal is filtered via some RF narrowband filters, and then a value of the amount of system dispersion is determined through an analysis of several narrowband spectrum components. In this solution, correspondence relationship between the cosine expansion degree of the power spectrum of a square law receiver and the amount of signal dispersion is utilized. Here, the reference numbers in FIG. 3 are respectively as follows: 300 represents input optical signal; 301 represents photoelectric converter; 302 represents adjustable amplifier; 303 represents band-pass filter; 304 represents adjustable amplifier; 305 represents band-pass filter; 306 represents square detector; 307 represents low pass filter; 308 represents A/D converter; 309 represents digital signal processor; and 310 represents dispersion control signal.

In the above patent, the wave trough position of power spectrum is searched for by high-density sampling for the power spectrum, and the amount of dispersion of a signal is determined with the offset direction and offset amount of the wave trough position. The high-density sampling is necessary for positioning accurately the wave trough position, which complicates the configuration of the detection system, and increases the cost of the same. Further, even a tiny change from the amount of dispersion of a signal needs to be detected and compensated in a high speed system. However, the change of the wave trough position is not sensitive to a tiny variety in the amount of dispersion, which limits the application of this solution in the high speed system. In addition, in this solution, the electric power at each filter's output needs to be amplified, which increases power consumption of the system.

SUMMARY OF THE INVENTION

An object of the present invention is to overcome disadvantages of the method and device for detecting dispersion, which are complex and insensitive to a tiny dispersion, in the prior art. The present invention provides a detection method and device, which are used for an adaptive dispersion compensation system, with simple implementation, and an optical signal transmission system.

The method for detecting dispersion provided in the present invention includes the following steps.

Obtaining an electric signal within a predetermined bandwidth range from a received optical signal.

Obtaining an operated value of a power via an operation on the electric signal within the predetermined bandwidth range.

Obtaining an amount of system dispersion from a correspondence relationship between the operated value of power and the amount of system dispersion.

The device for detecting dispersion provided in the present invention includes a photoelectric filter operational unit and a processing unit.

The photoelectric filter operational unit is adapted to obtain an electric signal within a predetermined bandwidth range based on an optical signal received, and obtain an operated value of power via an operation on the electric signal within the predetermined bandwidth range.

The processing unit is adapted to obtain the amount of system dispersion through a correspondence relationship between the operated value of power and the amount of system dispersion.

The optical signal transmission system provided in the present invention includes an adjustable dispersion compensation module and an light splitting module which are connected in serial in an optical fiber path, and a dispersion detecting module adapted to obtain detection light from the light splitting module for detecting the amount of system dispersion, and a control module connected in serial between the adjustable dispersion compensation module and the dispersion detecting module. The dispersion detecting module includes a photoelectric filter operational unit and a processing unit.

The photoelectric filter operational unit is adapted to obtain an electric signal within a predetermined bandwidth range based on an optical signal received, and obtain an operated value of power via an operation on the electric signal within the predetermined bandwidth range.

The processing unit is adapted to obtain the amount of system dispersion through a correspondence relationship between the operated value of power and the amount of system dispersion.

The present invention has advantages as follows.

1. Compared with solution 1 in the prior art, the system of dispersion detection and compensation in the present invention is free of the complex and costly clock recovery unit.

2. Compared with solution 2 in the prior art, no additional detection light needs to be added at the transmission side in the present invention, so that bandwidth resources are saved, and the impact of the detection light on the signal light is avoided.

3. Compared with solution 3 in the prior art, total power or average power is desired to be monitored in the present invention, and the method to obtain them is simple and unique, which is more feasible in a practical system application.

4. The present invention is applicable for not only a scenario with an unchanged link, but also a scenario with a changeable link.

5. In the present invention, the average power or total power is calculated within a certain bandwidth range, and therefore it is relatively sensitive to tiny dispersion.

DETAILED DESCRIPTION OF THE EMBODIMENTS

Preferred embodiments of the present invention are described below with reference to accompanying drawings.

Principals of the present invention are explained firstly by taking an example of a single frequency raised cosine signal.

Assume a signal $I=I_0(1+m\cos(2\pi ft))$, $m\ll 1$, where, $I_0$ denotes the average power of signal, and m denotes modulation depth. The power spectrum density outputted after square detection is $I_f=I_0 m|\cos(\pi\lambda^2 D_r f^2/c)|$, where, $\lambda$ denotes a carrier wavelength, $D_r$ denotes transmission system dispersion, and c denotes a velocity of light in the vacuum.

The first extreme value point of dispersion indicates a first zero point in the system impulse response spectrum of dispersion, and the second extreme value point of dispersion indicates a second zero point in the system impulse response spectrum of dispersion, and the like. A frequency point F corresponding to the first extreme value point of dispersion is obtained by calculating, where, $F=(C/2D_r\lambda^2)^{1/2}$. It can be seen from the correspondence relationship between the first extreme value point F of dispersion and the system dispersion $D_r$, that, when the system dispersion $D_r$ increases, the value of frequency that corresponds to the first minimum point F of dispersion decreases, and when the system dispersion $D_r$ decreases, the value of frequency that corresponds to the first minimum point F of dispersion increases.

With respect to the spectrum intensity $I_f=I_0m|\cos(\pi\lambda^2 D_r f^2/c)|$, a sum may be calculated in a selected bandwidth range, and a relationship between total power and the system dispersion $D_r$ in the selected bandwidth range may be obtained from the expression of spectrum intensity above. One-to-one correspondence relationship exists between the total power and the system dispersion $D_r$. The total power decreases when the system dispersion $D_r$ increases, and increases when the $D_r$ decreases.

Figure 4:
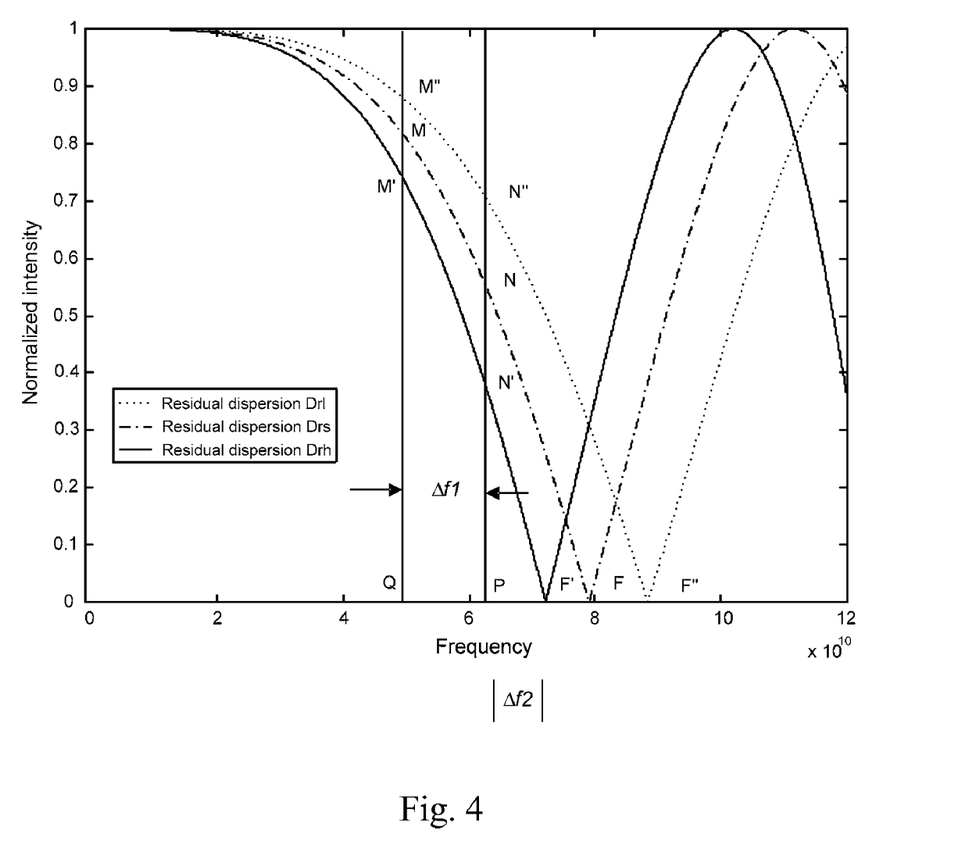
FIG. 4 is a schematic diagram illustrating an electric signal amplitude-frequency characteristic curve that the spectrum intensity is normalized, in which the electric signal is obtained from the square detection of an optical signal pulse transmitted on an optical fiber.

Referring to FIG. 4, it is a schematic diagram illustrating an electric signal amplitude-frequency characteristic curve that the spectrum intensity is normalized, in which the electric signal is obtained from the square detection of an optical signal pulse transmitted on an optical fiber. The first minimum point of dispersion of the spectrum intensity is located at F (the second minimum point of dispersion and other minimum points are not shown). Because of the effect of dispersion, this amplitude-frequency characteristic is different from the ideal amplitude-frequency characteristic without dispersion. The position of F is fixed if the system dispersion is constant. Otherwise, the position of F changes with the system dispersion. When the dispersion of a signal increases, the first minimum point of dispersion shifts from the frequency point F towards lower frequency, as shown by frequency point F' in FIG. 4. When the dispersion of the signal decreases, the first minimum point F of dispersion shifts towards higher frequency, as shown by frequency point F" in FIG. 4. A change in the spectrum density causes the arc MN moves towards M'N' or M"N", and thus the total power in the area surrounded by characters M, N, P and Q is changed. In other words, when the system dispersion $D_r$ increases, the total power in the area surrounded by characters M, N, P and Q decreases, and when the system dispersion $D_r$ decreases, the total power in the area surrounded by characters M, N, P and Q increases.

With respect to the spectrum intensity $I_f=I_0M|\cos(\pi\lambda^2 D_r f^2/c)|$, if an average value is calculated in a selected bandwidth range, the relationship between average power and the system dispersion $D_r$ in the selected bandwidth range may be obtained from the expression of spectrum intensity above. One-to-one correspondence relationship exists between the average power and the system dispersion $D_r$. The average power decreases when the system dispersion $D_r$ increases, and increases when the $D_r$ decreases.

To prevent nonlinearity, both local dispersion and dispersion of a system may not be zero. Otherwise, no first minimum point of the dispersion exists, or the first minimum point of the dispersion is at an infinite distance. If the standard system dispersion is $D_{rs}\neq 0$, a standard first minimum point of dispersion is ensured to exist in a real system, and a real first minimum point of dispersion varies with the system dispersion around the standard first minimum point of dispersion.

If the standard dispersion is $D_{rs}$, the corresponding normalized intensity curve is shown as the dot-and-dash line in FIG. 4. Assuming that the real dispersion of a system is $D_r$, where, $D_r$ satisfies $D_{rl}\leq D_r\leq D_{rh}$. If the dispersion is $D_{rl}$, the corresponding normalized intensity curve is shown as the dotted line in FIG. 4. If the dispersion is $D_{rh}$, the corresponding normalized intensity curve is shown as the solid line in FIG. 4.

In the present invention, the amount of system dispersion is determined by measuring the power of a signal within a bandwidth range $\Delta f1$ with upper and lower borders corresponding to frequency points P and Q. With the correspondence relationship between total power or average power within the bandwidth range $\Delta f1$ and the amount of system dispersion, the amount of system dispersion is obtained, and the amount of system dispersion compensation is obtained from the calculation of a difference between the amount of system dispersion and that of standard dispersion, and then a control amount for dispersion compensation in the system is obtained according to a specific dispersion compensation solution of the system, thereby the dispersion compensation is performed for the system.

Figure 5:
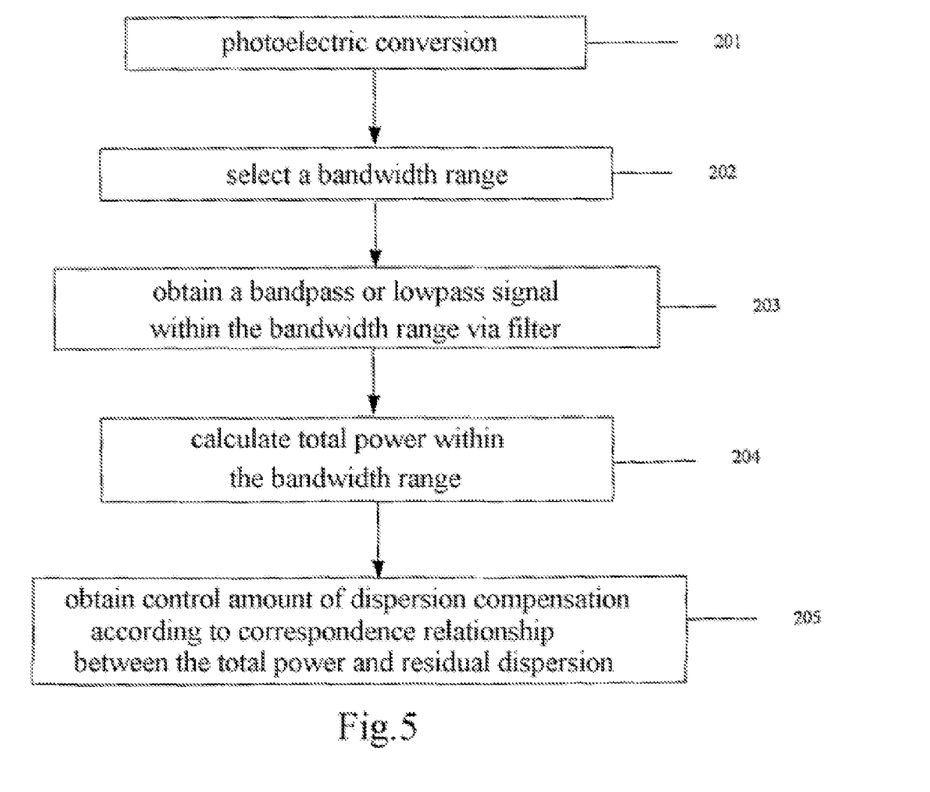
FIG. 5 is a flowchart of a method for detecting dispersion according to an embodiment of the present invention.

Referring to FIG. 5, the method for detecting dispersion according to an embodiment of the present invention includes the following steps.

In step 201, an electric signal is obtained through photoelectric conversion of an optical signal. In the embodiment, taking an intensity modulated raised cosine pulse for example, assuming that the optical pulse intensity $I=I_0(1+m\cos(2\pi ft))$, $m\ll 1$, where, $I_0$ denotes the average power of pulse, and m denotes the modulation depth. The power spectrum outputted after square detection in the photoelectric conversion is expressed as $I_f=I_0m\cos(\pi\lambda^2 D_r f^2/c)|$, where, $\lambda$ denotes the carrier wavelength, $D_r$ denotes the transmission system dispersion, and c denotes the velocity of light in the vacuum.

In the embodiment, the intensity modulation is used as a light modulation approach. Other modulation approaches may also be used, such as the phase modulation, frequency modulation and polarization modulation.

In step 202, a bandwidth range $\Delta f1$ is selected, and the upper and lower frequency borders of which are selected under the principles that the upper frequency value P is lower than a frequency value corresponding to the first minimum point of the power spectrum density dispersion of the electric signal, and the lower frequency value Q is selected as such a frequency value that enables the power most sensitive to a dispersion change, with the frequency value at the optimal point being 0.

In practice, a guard band $\Delta f2$ which is smaller than the frequency difference between the point P and the point F may be set. The $\Delta f2$ is selected under the principle that the frequency point of P is as small as possible without transferring to a side of the F with higher frequency.

In step 203, the power spectrum that is within the bandwidth range $\Delta f1$ and has upper and lower frequency borders of Q and P is separated out by filtering the obtained power signal, and thereby a band-pass or low pass signal is obtained.

The step 201 above may be performed after the step 203, in other words, firstly, an optical signal with bandwidth range $\Delta f1$ is obtained by filtering the optical signal with an optical band-pass filter, and then an electric signal is obtained through photoelectric conversion on the filtered optical signal. In the embodiment, the electric signal is the power signal.

In step 204, the band-pass or low pass signal obtained through separation via filter is summed up, so that the total power of the signal having upper and lower frequency borders of Q and P and bandwidth range of $\Delta f1$ is obtained.

In step 205, the amount of system dispersion is obtained based on the correspondence relationship between the total power and the amount of system dispersion.

There is a fixed correspondence relationship between the obtained total power and the amount of system dispersion, and the fixed correspondence relationship may be deduced from $I_f=I_0m|\cos(\pi\lambda^2 D_r f^2/c)|$. Therefore, the amount of system dispersion may be obtained through detection of the total power. Further, the obtained total power may be converted to the amount of dispersion compensation and amount of control, which are used as the amount of control of a dispersion compensation system for compensating the dispersion.

In the implementation, the relationship among the total power, the amount of dispersion, the amount of dispersion compensation and the control amount of the dispersion compensation may be built into a lookup table that is stored in a storage device such as RAM. In practice, this lookup table may be invoked in real time for obtaining the control amount of dispersion compensation which is then inputted to a control module, to control a dispersion compensation module to generate corresponding amount of dispersion compensation.

Before the lookup table is invoked, an analog signal of total power may be converted into a digital signal, which is used as an index for searching for the corresponding control amount of dispersion compensation in the lookup table. Referring to Table 1, an example of the lookup table is shown.

TABLE 1

| Output power of A/D converter (dBw) | Amount of system dispersion (ps/nm) | Amount of system dispersion compensation (ps/nm) | Control amount of dispersion compensation (a.u.) |
|---|---|---|---|
| −54.48 | 15 | 10 | 10 |
| −54.70 | 10 | 5 | 5 |
| −54.90 | 5 | 0 | 0 |
| −55.10 | 0 | −5 | −5 |
| −55.20 | −5 | −10 | −10 |
| −55.28 | −10 | −15 | −15 |
| −55.30 | −15 | −20 | −20 |

For obtaining the data in the above table, the following experiment conditions are included.

A 40 Gbit/s Gauss pulse sequence is used, Full Width at Half Maximum (FWHM) of a pulse is 6.25 ps, peak power of an input signal is 10 dBm, standard dispersion of system is 42 ps/nm, a first minimum point of dispersion is at 36.8 GHz, and P=36 GHz, Q=0 GHz. Output power of an A/D converter is the total power within the bandwidth.

Figure 12:
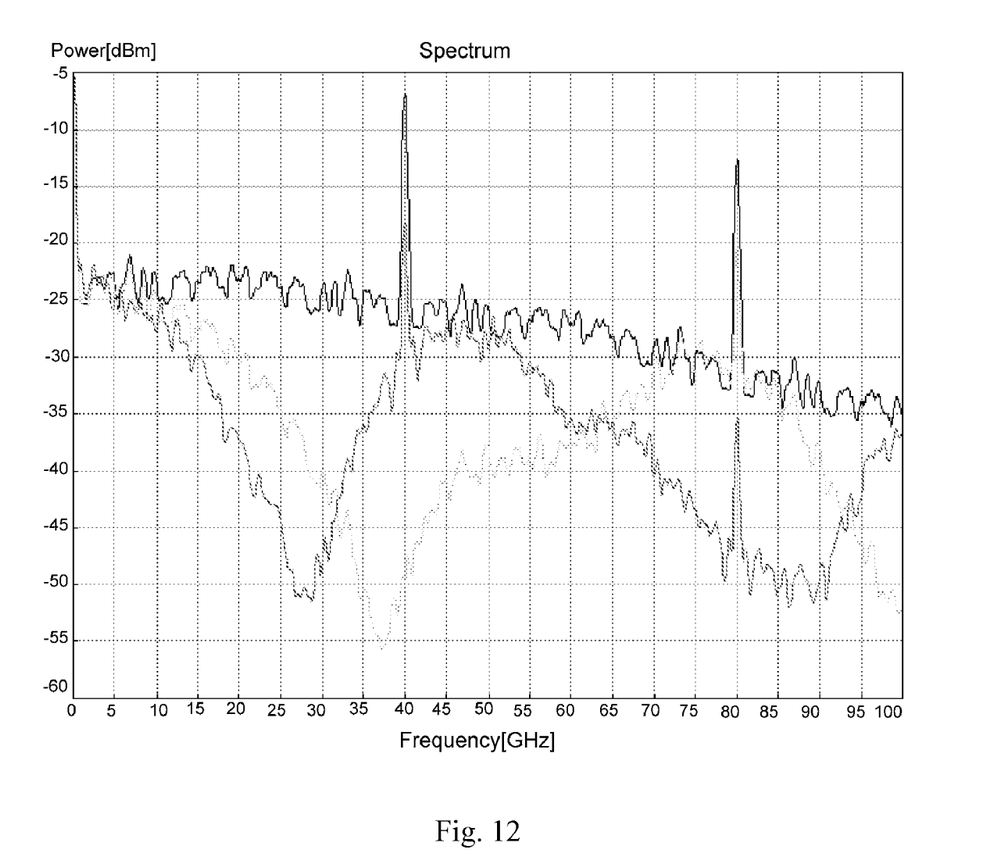
FIG. 12 is a diagram showing a simulation result of power spectrum density.

Referring to FIG. 12, a diagram illustrating the simulation result of power spectrum density with the above data used as experiment conditions is shown. Where, curve 1 represents the power spectrum density of a source signal, while curve 2 represents the power spectrum density of the signal in the case that the dispersion is 55 ps/nm, and curve 3 represents the power spectrum density of the signal in the case that the dispersion is 41.6 ps/nm.

The control amount of dispersion compensation depends on a specific dispersion compensation technology. The above data is generated via the Dispersion Compensation Fiber (DCF).

In the case that the link is unchanged, there is a unique standard dispersion. In step 205, an analog signal of power may not be converted into a digital signal before the lookup table is invoked, instead, the lookup table may be searched directly. Referring to Table 2, the lookup table is searched in a multiple-to-one approach in stead of the one-to-one approach for searching Table 1.

TABLE 2

| Output power from integrator (dBw) | Amount of system dispersion (ps/nm) | Amount of system dispersion compensation (ps/nm) | Control amount of dispersion compensation (a.u.) |
|---|---|---|---|
| $x_1$~$x_2$ | $y_1$ | $z_1$ | $w_1$ |
| $x_2$~$x_3$ | $y_2$ | $z_2$ | $w_2$ |
| $x_3$~$x_4$ | $y_3$ | $z_3$ | $z_3$ |
| ... | ... | ... | ... |
| $x_{n-1}$~$x_n$ | $y_n$ | $z_n$ | $w_n$ |

In the embodiment above, the amount of system dispersion is determined by measuring a change in the total power of a signal within the bandwidth range Δf1 having upper and lower borders corresponding to frequency point P and Q. Further, the amount of system dispersion may be determined by calculating a change in the average power, and the other steps are substantially the same as those in the above embodiment and thus are not described in detail here.

The above embodiment is suitable for the case in which nonlinearity effect in a system may be ignored. If the nonlinearity effect in the system is relatively significant, to reduce the impact of the nonlinearity effect, firstly, the total power (or average power) within the selected bandwidth range is calculated according to the above embodiment, and then a further total power (or average power) within a nonlinear sensitive region is calculated, where the upper frequency border of the nonlinear sensitive region is smaller than the lower frequency border of the selected bandwidth range to which the nonlinear sensitive region belongs. Because the nonlinear sensitive region is located in a lower frequency region, the lower frequency point is at 0. A ratio of the total powers or average powers of the two regions is obtained. The ratio also has a one-to-one correspondence relationship with the amount of system dispersion, and therefore, with the ratio, the amount of system dispersion may also be obtained and used as the control amount of dispersion compensation system. The subsequent step is the same as the step 205, and thus will not be described in detail here.

Figure 6:
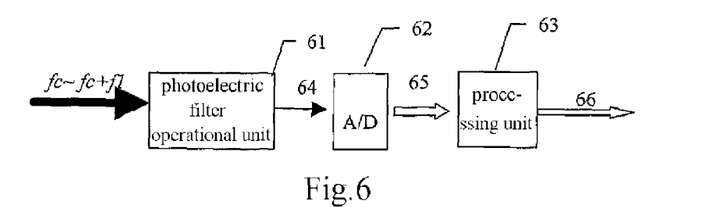
FIG. 6 is a structural diagram of a device for detecting dispersion according to an embodiment of the present invention.

In another embodiment of the method of the present invention, firstly, an optical signal may also be selected within a predetermined bandwidth range, of which an upper border is smaller than the value of frequency corresponding to the first minimum point of dispersion of the power spectrum density, and then an electric signal is obtained through photoelectric conversion of an optical signal in the predetermined bandwidth range. And further processing for the electric signal may be performed with reference to the embodiment shown in FIG. 5. Further, an embodiment of a device for detecting dispersion provided in the present invention is shown in FIG. 6, and the device for detecting dispersion includes a photoelectric filter operational unit 61, an A/D converter 62, and a processing unit 63.

The photoelectric filter operational unit 61 is adapted to separate out an electric signal in the selected bandwidth range, obtain an operated value of power via an operation on the electric signal within the predetermined bandwidth range, and convert an optical signal to an electric signal.

The A/D converter 62 is adapted to convert an analog signal into a digital signal.

The processing unit 63 is adapted to obtain the amount of system dispersion through a correspondence relationship between the operated value of power and the amount of system dispersion, and further obtain the amount of system dispersion compensation and control amount of system dispersion compensation.

An electric signal 64 outputted from the output of the photoelectric filter operational unit 61 is inputted to the input of the A/D converter 62, and an digital signal 65 outputted from the output of the A/D converter 62 is inputted to the input of the processing unit 63.

Figure 7A:
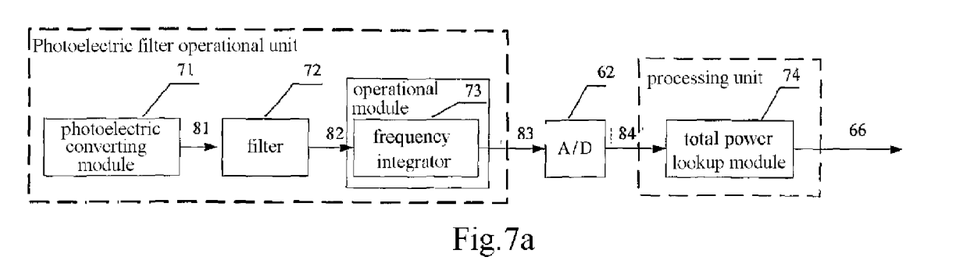
FIG. 7a is a structural diagram of a device for detecting dispersion in which an integrator is employed in an operational module according to the present invention.

Referring to FIG. 7a, the photoelectric filter operational unit includes a photoelectric converting module 71, a filter 72, and an operational module. In the embodiment, the operational module is a frequency integrator 73, and the processing unit is a total power lookup module 74.

An optical signal having an optical carrier of $f_c$ is inputted into the photoelectric converting module 71 to obtain an electric signal 81; then power spectrum that is within the bandwidth range Δf1 and has upper and lower frequency borders of Q and P is separated out via the filter 72 to obtain a band-pass or low pass signal 82, which is then inputted to the frequency integrator 73. An analog signal 83 of the total power that indicates a total power of a signal having upper and lower frequency borders of Q and P and having a bandwidth range of $\Delta f1$ is outputted from the frequency integrator 73. Through the A/D converter 62, the analog signal 83 of the total power is converted into a digital signal 84 of the total power, which is used as an index for searching for the corresponding amount of system dispersion in the total power lookup module 74, and thereby the amount of system dispersion compensation and control amount of system dispersion compensation 66 is obtained. An example of the lookup table is shown in Table 1. The photoelectric converting module 71 may be implemented with a PIN transistor or other photoelectric detection devices. Because there is a fixed correspondence relationship between the detected energy and the amount of signal dispersion, the total power lookup module is a storage device, such as RAM, in which the relationship between the detected power and the amount of system dispersion is stored. In practice, the lookup table in the total power lookup module is invoked in real time. In addition, a correspondence relationship among the power, the amount of dispersion, the amount of dispersion compensation and the control amount of dispersion compensation may be stored in the total power lookup module. In this way, the amount of system dispersion compensation and control amount of system dispersion compensation 66 may be obtained directly from the total power lookup module 74.

Figure 7B:
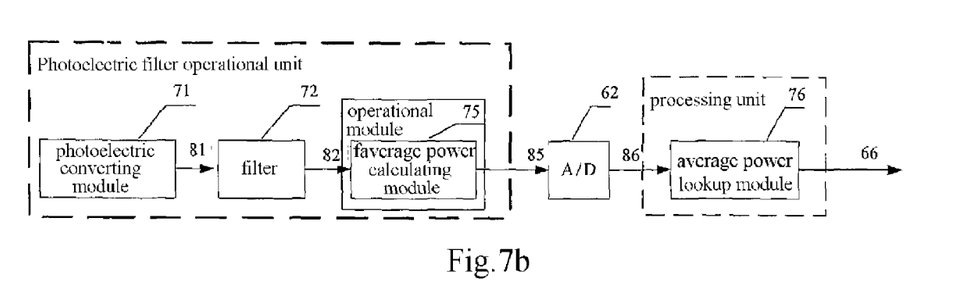
FIG. 7b is a structural diagram of a device for detecting dispersion in which an average power calculating module is employed in an operational module according to the present invention.

Referring to FIG. 7b, the frequency integrator 73 in the operational module may be replaced by an average power calculating module 75, and the total power lookup module 74 in the processing unit may be replaced by an average power lookup module 76.

The band-pass or low pass signal 82 outputted from the filter 72 is inputted to the average power calculating module 75 to obtain an analog signal 85 of the average power of an electric signal in the selected bandwidth range. Through the A/D converter 62, the analog signal 85 of the average power is converted into a digital signal 86 of the average power, which is used as an index for searching for the corresponding amount of system dispersion in the average power lookup module 76, and thereby the amount of system dispersion compensation and control amount of system dispersion compensation 66 is obtained. The other relationships between signals are the same as those in the above embodiment, and thus are not described in detail here.

Figure 7C:
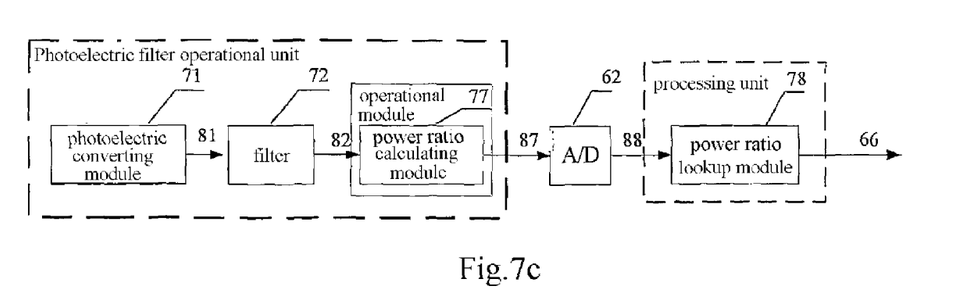
FIG. 7c is a structural diagram of a device for detecting dispersion in which a power ratio calculating module is employed in an operational module according to the present invention.

Referring to FIG. 7c, the frequency integrator 73 in the processing unit may be replaced by a power ratio calculating module 77, and the total power lookup module 74 in the processing unit may be replaced by a power ratio lookup module 78.

The band-pass or low pass signal 82 outputted from the filter 72 is inputted to the power ratio calculating module 77 to obtain a ratio 87 between the average power or total power of an electric signal in the selected bandwidth range and that in the nonlinear sensitive region. Through the A/D converter 62, the analog signal 87 of the power ratio is converted into a digital signal 88 of the power ratio, which is used as an index for searching for the corresponding amount of system dispersion in the power ratio lookup module 78, and thereby the amount of system dispersion compensation and control amount of system dispersion compensation 66 is obtained. The other relationships between signals are the same as those in the above embodiment, and thus are not described in detail here.

Figure 8:
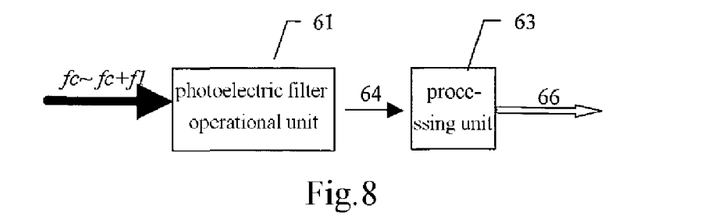
FIG. 8 is a structural diagram of a device for detecting dispersion according to another embodiment of the present invention.

For a case in which the link is unchanged, the device does not need to include the A/D converter 62. As shown in FIG. 8, the device includes a photoelectric filter operational unit 61 and a processing unit 63. The output of the photoelectric filter operational unit 61 is connected to the input of the processing unit 63. An analog signal 64 outputted from the photoelectric filter operational unit 61 is directly inputted into a lookup module of the processing unit for performing searching. Accordingly, a lookup table in the lookup module is searched in a multiple-to-one approach. This case is suitable for the structure in which an integrator, an average power calculating module or a power ratio calculating module is employed in the operational module, and the A/D converter may not be included. This has a similar structure with that in the above embodiment and is not described in detail here.

Figure 9:
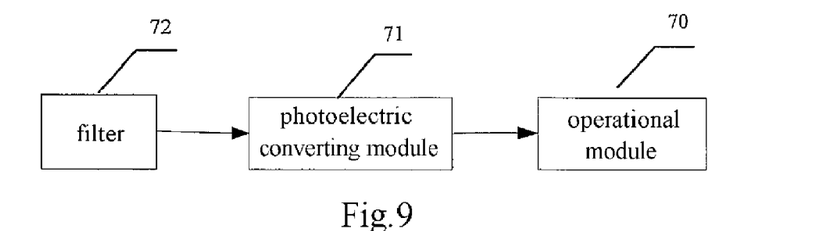
FIG. 9 is a diagram showing a structure of the photoelectric filter operational unit provided in the present invention.

In the above embodiments, the photoelectric converting module 71 is located in front of the filter 72 in the photoelectric filter operational unit. In practice, as shown in FIG. 9, the filter 72 may be located in front of the photoelectric converting module 71 with the output of the filter 72 connected to the input of the photoelectric converting module 71, and then the filter is an optical band-pass filter.

The device for detecting dispersion provided in the present invention may be used to construct an adjustable dispersion compensation system.

Figure 10:
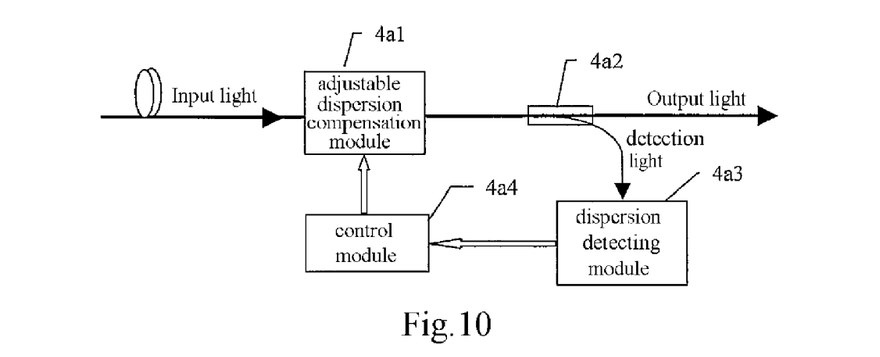
FIG. 10 is a structural diagram of an adaptive compensation system, employing the device for detecting dispersion, which is applicable to the transmission side and the line according to an embodiment of the present invention.
Figure 11:
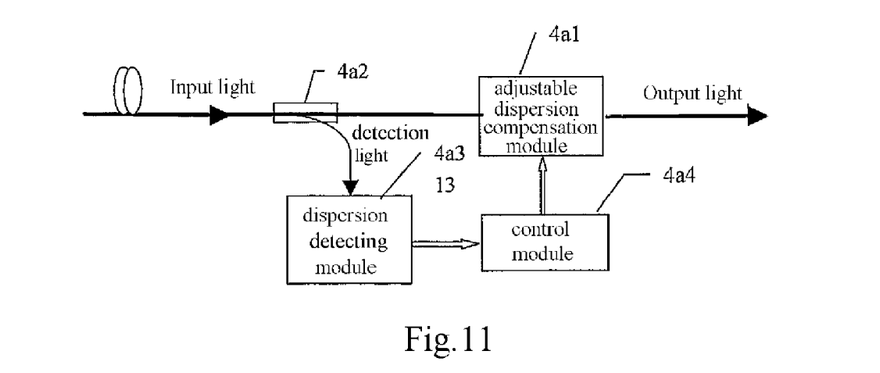
FIG. 11 is a structural diagram of an adaptive compensation system, employing the device for detecting dispersion, which is applicable to the reception side according to an embodiment of the present invention.

Referring to FIG. 10, an embodiment of a system in which an adjustable dispersion compensation module is applicable to the transmission side and the line is shown. In FIG. 11, an embodiment of a system in which an adjustable dispersion compensation module is applicable to the reception side is shown. The systems shown in FIG. 10 or 11 includes an adjustable dispersion compensation module and an light splitting module (i.e. a light splitter) which are connected in serial in an optical fiber path, a dispersion detecting module adapted to obtain detection light from the light splitting module for detecting amount of system dispersion, and a control module connected in serial between the adjustable dispersion compensation module and the dispersion detecting module. The dispersion detecting module includes a photoelectric filter operational unit and a processing unit. The photoelectric filter operational unit is adapted to obtain an electric signal within a predetermined bandwidth range from a received optical signal, and obtain an operated value of power from the operation on the electric signal within the predetermined bandwidth range; the processing unit is adapted to obtain the amount of system dispersion by using a correspondence relationship between the operated value of power and the amount of system dispersion.

In the system as shown in FIG. 10, an optical signal is inputted into an adjustable dispersion compensation module 4a1 after transmission over a line. Part of the output light on which the dispersion compensation has been performed is split, by a light splitter 4a2, to be used as detection light which is then inputted into a dispersion detecting module 4a3. A control module 4a4 feeds back a control signal to the adjustable dispersion compensation module according to the result of dispersion amount detected by the dispersion detecting module, so as to adjust the amount of dispersion compensation to achieve the optimal performance of the system. A transmission segment may or may not be provided between the adjustable dispersion compensation module 4a1 and the light splitter 4a2.

In the system as shown in FIG. 11, after being transmitted over a line, part of the optical signal is split firstly, by a light splitter 4a2, to be used as detection light which is then inputted into a dispersion detecting module 4a3. A control module 4a4 feeds back a control signal to the adjustable dispersion compensation module 4a1 according to the result of dispersion amount detected by the dispersion detecting module, so as to adjust the amount of dispersion compensation to achieve the optimal performance of the system.

The foregoing descriptions have explained the preferred embodiments of the present invention. It will be apparent to those skilled in the art that modifications and alternations can be made to the invention without departing from the scope and spirit of the present invention, and all the modifications and alternations are intended to be within the scope of the present invention.

What is claimed is:

1. A method for detecting dispersion, comprising:
    obtaining an electric signal within a predetermined bandwidth range from a received optical signal;
    obtaining an operated value of a power via an operation on the electric signal within the predetermined bandwidth range; and
    obtaining an amount of system dispersion according to a correspondence relationship between the operated value of the power and the amount of the system dispersion;
    wherein the electric signal within the predetermined bandwidth range is obtained with the steps of:
    (a) obtaining the electric signal through photoelectric conversion on the received optical signal; and
    (b) selecting the electric signal within the predetermined bandwidth range which has an upper border lower than a frequency value corresponding to a first minimum point of power spectrum density curve with dispersion;
    (c) selecting an optical signal within the predetermined bandwidth range which has the upper border lower than the frequency value corresponding to the first minimum point of the power spectrum density curve with dispersion;
    (d) obtaining the electric signal through the photoelectric conversion on the optical signal within the predetermined bandwidth range.

2. The method for detecting dispersion according to claim 1, wherein a total power of the electric signal within the predetermined bandwidth range is obtained via a sum operation on the electric signal within the predetermined bandwidth range, and
    the amount of the system dispersion is obtained according to a correspondence relationship between the total power and the amount of the system dispersion.

3. The method for detecting dispersion according to claim 1, wherein a total power of the electric signal within the predetermined bandwidth range is obtained via a sum operation on the electric signal within the predetermined bandwidth range, and
    the amount of the system dispersion is obtained according to a correspondence relationship between the total power and the amount of the system dispersion.

4. The method for detecting dispersion according to claim 1, wherein average power of the electric signal within the predetermined bandwidth range is obtained via an averaging operation on the electric signal within the predetermined bandwidth range, and
    the amount of the system dispersion is obtained according to a correspondence relationship between the average power and the amount of the system dispersion.

5. The method for detecting dispersion according to claim 1, wherein average power of the electric signal within the predetermined bandwidth range is obtained via an averaging operation on the electric signal within the predetermined bandwidth range, and
    the amount of the system dispersion is obtained according to a correspondence relationship between the average power and the amount of the system dispersion.

6. The method for detecting dispersion according to claim 1, further comprising:
    obtaining the total power of the electric signal within the predetermined bandwidth range via the addition operation on the electric signal within the predetermined bandwidth range;
    then obtaining a ratio between the total power of the electric signal within the predetermined bandwidth range and a total power of an electric signal within a nonlinear sensitive region via a division operation on the total power of the electric signal within the predetermined bandwidth range and the total power of the electric signal within a nonlinear sensitive region, and
    obtaining the amount of the system dispersion according to a correspondence relationship between the ratio of the total powers and the amount of the system dispersion.

7. The method for detecting dispersion according to claim 1, further comprising:
    obtaining the total power of the electric signal within the predetermined bandwidth range via an addition operation on the electric signal within the predetermined bandwidth range;
    then obtaining a ratio between the total power of the electric signal within the predetermined bandwidth range and a total power of an electric signal within a nonlinear sensitive region via a division operation on the total power of the electric signal within the predetermined bandwidth range and the total power of the electric signal within a nonlinear sensitive region, and
    obtaining the amount of the system dispersion according to a correspondence relationship between the ratio of the total powers and the amount of the system dispersion.

8. The method for detecting dispersion according to claim 1, further comprising:
    obtaining the average power of the electric signal within the predetermined bandwidth range via an averaging operation on the electric signal within the predetermined bandwidth range;
    then obtaining a ratio between the average power of the electric signal within the predetermined bandwidth range and an average power of an electric signal within a nonlinear sensitive region via a division operation on the average power of the electric signal within the predetermined bandwidth range and the average power of the electric signal within the nonlinear sensitive region, and
    obtaining the amount of the system dispersion according to a correspondence relationship between the ratio of average powers and the amount of the system dispersion.

9. The method for detecting dispersion according to claim 1, further comprising:
    obtaining the average power of the electric signal within the predetermined bandwidth range via an averaging operation on the electric signal within the predetermined bandwidth range;
    then obtaining a ratio between the average power of the electric signal within the predetermined bandwidth range and an average power of an electric signal within a nonlinear sensitive region via a division operation on the average power of the electric signal within the predetermined bandwidth range and the average power of the electric signal within the nonlinear sensitive region, and obtaining the amount of the system dispersion according to a correspondence relationship between the ratio of average powers and the amount of the system dispersion.

10. A device for detecting dispersion, comprising a photoelectric filter operational unit and a processing unit, wherein, the photoelectric filter operational unit is adapted to obtain an electric signal within a predetermined bandwidth range from a received optical signal, and obtain an operated value of power via an operation on the electric signal within the predetermined bandwidth range; and the processing unit is adapted to obtain an amount of system dispersion according to a correspondence relationship between the operated value of the power and the amount of the system dispersion;

wherein the photoelectric filter operational unit comprises a photoelectric converting module, a filter and an operational module, wherein, (a) the photoelectric converting module is adapted to convert the received optical signal into the electric signal; and (b) the filter is adapted to filter out the electric signal within the predetermined bandwidth range outputted from the photoelectric converting module, where an upper border of the predetermined bandwidth range is lower than a frequency value corresponding to a first minimum point of power spectrum density curve with dispersion; and (c) the operational module is adapted to obtain the operated value of power via the operation on the electric signal within the predetermine bandwidth range;

or, (d) the photoelectric converting module is adapted to convert the received optical signal outputted from the filter into the electric signal;

(e) the filter is adapted to filter out an optical signal within the predetermined bandwidth range, and the upper border of the predetermined bandwidth range is lower than the frequency corresponding to the first minimum point of power spectrum density curve with dispersion; and (f) the operational module is adapted to obtain the operated value of power via the operation on the signal within the predetermine bandwidth range.

11. The device for detecting dispersion according to claim 10, wherein the operational module is an integrator and the processing unit is a total power lookup module.

12. The device for detecting dispersion according to claim 10, wherein the operational module is an average power calculating module and the processing unit is an average power lookup module.

13. The device for detecting dispersion according to claim 10, wherein the operational module is a power ratio calculating module and the processing unit is a power ratio lookup module.

14. The device for detecting dispersion according to claim 13, further comprising an A/D converter adapted to convert an analog signal into a digital signal, an input of the A/D converter connected to an output of the photoelectric filter operational unit, and an output of the A/D converter connected to an input of the processing module unit.

* * * * *

UNITED STATES PATENT AND TRADEMARK OFFICE
CERTIFICATE OF CORRECTION

PATENT NO. : 8,229,298 B2
APPLICATION NO. : 12/269502
DATED : July 24, 2012
INVENTOR(S) : Liu et al.

It is certified that error appears in the above-identified patent and that said Letters Patent is hereby corrected as shown below:

In the Claims:

In column 11, at the end of line 30, insert the following word: -- or --.

Signed and Sealed this
Twenty-third Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,229,298 B2
APPLICATION NO. : 12/269502
DATED : July 24, 2012
INVENTOR(S) : Liu et al.

Page 1 of 1

It is certified that error appears in the above-identified patent and that said Letters Patent is hereby corrected as shown below:

In the Claims:

In column 11, at line 25, replace the wording "the electric" with the wording "a electric".

In column 11, at line 33, replace the wording "the first" with the wording "a first".

In column 11, at the end of line 35, insert the wording --and--.

Signed and Sealed this
Eighth Day of October, 2013

Teresa Stanek Rea
*Deputy Director of the United States Patent and Trademark Office*